I. W. PARMENTER.
EVAPORATORS FOR HOT-AIR REGISTERS.

No. 188,535. Patented March 20, 1877.

Witnesses
Chas. H. Smith
Geo. D. Pinckney

Inventor
Isaac W. Parmenter
per Lemuel W. Serrell
atty

N. PETERS, PHOTO-LITHOGRAPHER, WASHINGTON, D. C.

UNITED STATES PATENT OFFICE.

ISAAC W. PARMENTER, OF NEW YORK, N. Y.

IMPROVEMENT IN EVAPORATORS FOR HOT-AIR REGISTERS.

Specification forming part of Letters Patent No. 188,535, dated March 20, 1877; application filed February 22, 1877.

*To all whom it may concern:*

Be it known that I, ISAAC W. PARMENTER, of the city and State of New York, have invented an Improvement in Atmospheric Evaporators for Rooms, Heating Apparatus, &c., of which the following is a specification:

Devices have heretofore been made for pans of water contiguous to furnaces and hot-air currents, so that the water may be evaporated to purify and moisten the air in dwellings and public buildings; but the surface of these evaporators is usually insufficient to furnish the necessary vapor, and the vessels are heavy and cumbersome.

My device is made for obtaining a large extent of evaporating surface in a small space, and rendering the apparatus portable and easily filled and cleaned.

I employ two or more shallow pans, one above the other, connected together and provided with overflow-pipes, so that the depth of water in each pan is limited, and the overflow passes to the pan next below. By this means the pans can be conveniently filled without the water being spilled. These pans are connected together, so as to be portable, and they can be hooked upon a register, suspended from a mantle, or placed adjacent to the air-draft, so that the water can be evaporated by the passing current of atmosphere; and this evaporator, although especially intended for use with artificial heat, may be employed in summer weather to moisten the air in an apartment.

Figure 1:
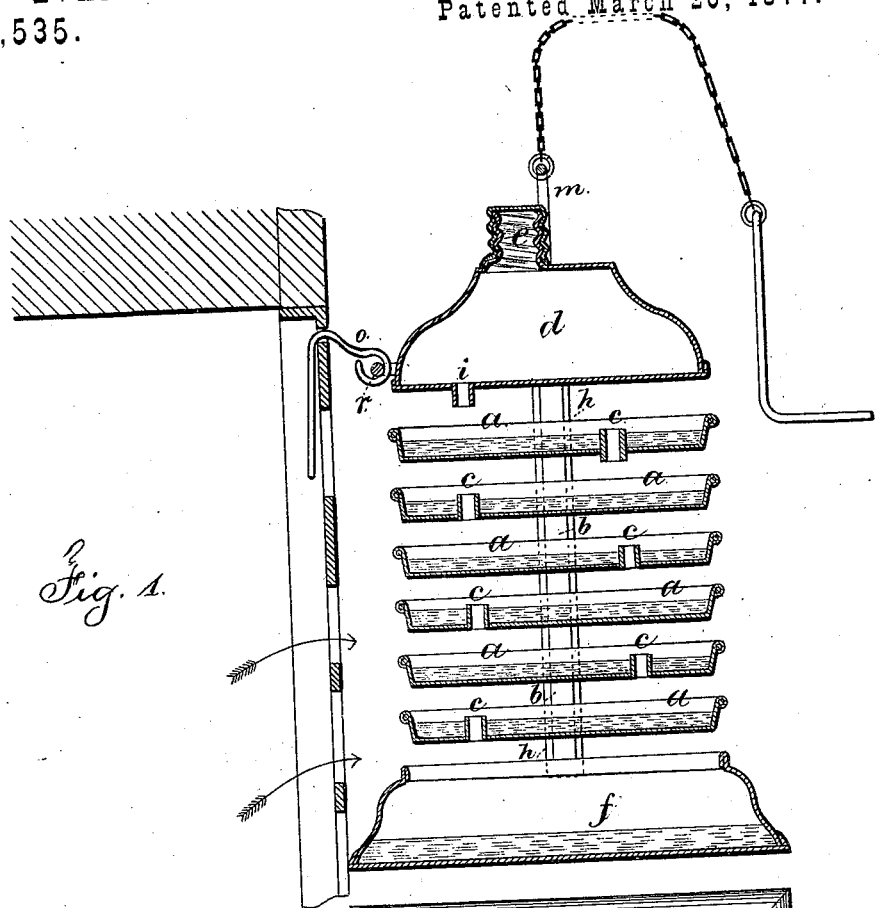
Figure 2:
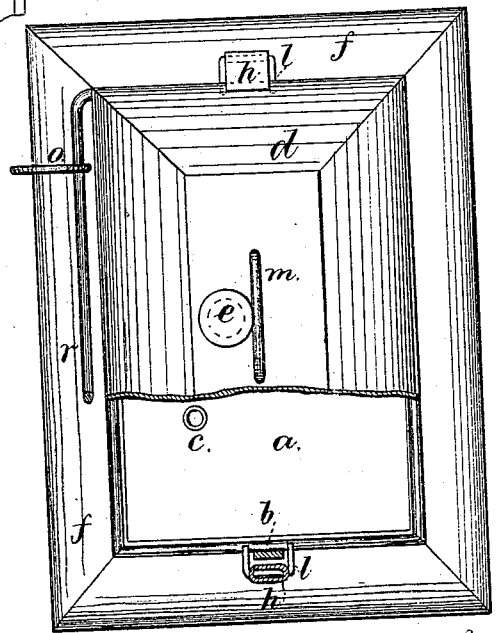

In the drawing, Figure 1 is a vertical section of the evaporator, as hooked against a vertical register-grating, and Fig. 2 is a plan of the same, partially in section.

The pans *a a* are either round or polygonal. I have shown them as oblong. There may be two or more. I have shown six; but for general use about ten are preferable. Each pan is shallow, and has an overflow-tube, *c*, through some part of the bottom or side, so that water will flow over the edge of said tube and pass down to the next pan below, and will not flow over the edge or rim of the pan.

These pans are preferably united into one or two sections by the bars *b b*, that pass from one to the other, and are soldered in place. The overflow-tubes may be of metal, or of short sections of india-rubber or other material placed through holes in the bottoms of the pans.

The reservoir *d* is preferably of an ornamental shape, and provided with a screw-cap to the filling-nozzle *e*, and a small pipe or cock at *i* serves to allow the water that is filled into the reservoir *d* to flow into the pans *a a*, and should there be a surplus passing to the bottom pan *a* it will overflow into the hollow base *f*.

The series of pans *a a* are removably introduced between the bars *h h* that connect the reservoir *d* and base *f*, so that these pans may be either inserted into place and secured by any suitable lock or catch *l*, or removed therefrom for washing or cleaning.

The handle *m* serves to transport this evaporator from place to place, and to it a cord or chain may be attached, passing to a hook or clamp that is applied to the edge of the mantel to suspend the evaporator in front of the mantel and the register thereof, or the hooks *o* upon the horizontal wires *r* may be connected directly to the vertical register-plate or grating, and these hooks can be moved along upon the wires or rods *r* to such positions that they can be hooked into the register-openings at places where they will support the evaporator in a horizontal position.

I claim as my invention—

1. The atmospheric evaporator, made of a series of shallow pans connected together and provided with overflow-pipes, substantially as set forth.

2. The combination of the reservoir *d*, base *f*, and series of shallow pans *a a*, substantially as and for the purposes set forth.

Signed by me this 17th day of February, A. D. 1877.

I. W. PARMENTER.

Witnesses:
GEO. T. PINCKNEY,
GEO. D. WALKER.